US012738234B2

(12) United States Patent
Lee

(10) Patent No.: US 12,738,234 B2

(45) Date of Patent: Sep. 15, 2026

(54) GATE DRIVING CIRCUIT AND DISPLAY DEVICE

(71) Applicant: LG DISPLAY CO., LTD., Seoul (KR)

(72) Inventor: Tae Gwan Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/936,124

(22) Filed: Nov. 4, 2024

(65) Prior Publication Data

US 2025/0232730 A1 Jul. 17, 2025

(30) Foreign Application Priority Data

Jan. 12, 2024 (KR) ........................ 10-2024-0005472

(51) Int. Cl.

*G09G 3/3266* (2016.01)

*G09G 3/3258* (2016.01)

(52) U.S. Cl.

CPC ......... *G09G 3/3266* (2013.01); *G09G 3/3258* (2013.01); *G09G 2310/08* (2013.01); *G09G 2330/021* (2013.01)

(58) Field of Classification Search

CPC ............. G09G 3/3677; G09G 2310/08; G09G 2310/0286; G09G 3/3688; G09G 3/3266; G09G 2310/0267; G09G 3/3674; G09G 3/3258; G09G 2330/021

See application file for complete search history.

(56) References Cited

U.S. PATENT DOCUMENTS

2012/0146978 A1* 6/2012 Park ..................... G11C 19/287 377/64

2017/0206847 A1* 7/2017 Park ......................... G09G 5/18

2021/0142714 A1* 5/2021 Sung .................... G09G 3/3696

2021/0201816 A1* 7/2021 Kim ...................... G09G 3/3266

2021/0327388 A1* 10/2021 Iwase ................... G09G 3/3674

* cited by examiner

*Primary Examiner* — Sujit Shah

(74) *Attorney, Agent, or Firm* — Fish & Richardson P.C.

(57) ABSTRACT

A display device includes a display panel in which a plurality of subpixels is disposed, and a gate driving circuit configured to output gate signals to the plurality of subpixels, wherein the gate driving circuit includes a gate signal generator configured to generate the gate signals, a gate signal output unit configured to output the gate signals, and a clock decoder configured to generate a plurality of scan clock signals for controlling output timings of the gate signals on the basis of at least two clock signals.

16 Claims, 10 Drawing Sheets

FIG. 10

| Decoder | | |
|---|---|---|
| Drain | Gate | Source |
| ACLK(1) | BCLK(3) | SCCLK(1) |
| ACLK(2) | BCLK(1) | SCCLK(2) |
| ACLK(3) | BCLK(2) | SCCLK(3) |
| ACLK(4) | BCLK(3) | SCCLK(4) |
| ACLK(1) | BCLK(4) | SCCLK(5) |
| ACLK(2) | BCLK(2) | SCCLK(6) |
| ACLK(3) | BCLK(3) | SCCLK(7) |
| ACLK(4) | BCLK(4) | SCCLK(8) |
| ACLK(1) | BCLK(1) | SCCLK(9) |
| ACLK(2) | BCLK(3) | SCCLK(10) |
| ACLK(3) | BCLK(4) | SCCLK(11) |
| ACLK(4) | BCLK(1) | SCCLK(12) |
| ACLK(1) | BCLK(2) | SCCLK(13) |
| ACLK(2) | BCLK(4) | SCCLK(14) |
| ACLK(3) | BCLK(1) | SCCLK(15) |
| ACLK(4) | BCLK(2) | SCCLK(16) |

GATE DRIVING CIRCUIT AND DISPLAY DEVICE

CROSS-REFERENCE TO RELATED DISCLOSURE

This disclosure claims the priority of Korean Patent Disclosure No. 10-2024-0005472, filed on Jan. 12, 2024, which is hereby incorporated by reference in its entirety.

BACKGROUND

Field of the Disclosure

The present disclosure relates to a gate driving circuit and a display device.

Description of the Background

A display device may include a plurality of subpixels disposed on a panel and various circuits that drive the plurality of subpixels. For example, a display device may include a gate driving circuit that controls driving timing of a plurality of subpixels and a data driving circuit that supplies data voltages corresponding to image data to the plurality of subpixels.

The gate driving circuit may be composed of a plurality of switches and lines for supplying gate pulses to a plurality of gate lines. This gate driving circuit may be formed directly on the same substrate along with the subpixels of the display panel. Since the gate driving circuit is disposed in a bezel area outside an active area, the size of the bezel area inevitably increases as the gate driving circuit becomes more complicated.

Therefore, research is continuing to maximize the efficiency of a design area by simplifying the gate driving circuit while securing the performance of the gate driving circuit to reduce the design area.

SUMMARY

Accordingly, the present disclosure is directed to a gate driving circuit and a display device that substantially obviate one or more problems due to limitations and disadvantages of the related art.

More specifically, the present disclosure is to provide a gate driving circuit and a display device for maximizing the efficiency of a design area of the gate driving circuit by reducing the design area.

Additional advantages and features of the present disclosure will be set forth in part in the description which follows and in part will become apparent to those having ordinary skill in the art upon examination of the following or may be learned from practice of the present disclosure. Other advantages of the present disclosure may be realized and attained by the structure particularly pointed out in the written description and claims hereof as well as the appended drawings.

To achieve these and other advantages and in accordance with the present disclosure, as embodied and broadly described herein, a display device includes a display panel in which a plurality of subpixels is disposed, and a gate driving circuit configured to output gate signals to the plurality of subpixels, wherein the gate driving circuit includes a gate signal generator configured to generate the gate signals, a gate signal output unit configured to output the gate signals, and a clock decoder configured to generate a plurality of scan clock signals for controlling output timings of the gate signals on the basis of at least two clock signals.

The clock decoder may generate the plurality of scan clock signals on the basis of a first clock signal and a second clock signal.

The clock decoder may include a switch interposed between a line through which the first clock signal is input and a scan clock signal line to control on/off of output of the first clock signal according to the second clock signal.

The clock decoder may include a transistor having a first electrode connected to the line through which the first clock signal is input, a gate electrode connected to a line through which the second clock signal is input, and a second electrode connected to a line through which the scan clock signals are applied to the gate signal output unit.

The display device may further include a boosting capacitor connected between the gate electrode and the second electrode.

The clock decoder may generate N×M scan clock signals on the basis of N first clock signals and M second clock signals.

The gate signal output unit may include a pull-up transistor controlled by a voltage level of a Q node, and a pull-down transistor controlled by a voltage level of a QB node, wherein first to k-th gate signals having the voltage level of the Q node or the voltage level of the QB node are output in accordance with the scan clock signals.

The gate signal output unit may sequentially output the first to k-th gate signals on the basis of the scan clock signals when the voltage level of the Q node is a high voltage level.

The scan clock signals may be input to a drain electrode of the pull-up transistor.

In another aspect of the present disclosure, a gate driving circuit includes a pull-up transistor controlled by a voltage level of a Q node, a pull-down transistor controlled by a voltage level of a QB node, and a clock decoder configured to generate a plurality of scan clock signals for controlling output timings of gate signals on the basis of at least two clock signals, wherein first to k-th gate signals having the voltage level of the Q node or the voltage level of the QB node in accordance with the scan clock signals.

The clock decoder may include a transistor having a first electrode connected to a first clock signal input line, a gate electrode connected to a second clock signal input line, and a second electrode connected to a line through which the scan clock signals are applied to a gate signal output unit.

The gate driving circuit may further include a boosting capacitor connected between the gate electrode and the second electrode.

The clock decoder may generate N×M scan clock signals on the basis of N first clock signals and M second clock signals.

It is to be understood that both the foregoing general description and the following detailed description of the present disclosure are exemplary and explanatory and are intended to provide further explanation of the present disclosure as claimed.

BRIEF DESCRIPTION OF THE DRAWINGS

The accompanying drawings, which are included to provide a further understanding of the present disclosure and are incorporated in and constitute a part of this disclosure, illustrate aspect(s) of the present disclosure and together with the description serve to explain the principle of the present disclosure.

In the drawings:

FIG. 10 is a clock generation table of a clock decoder according to an aspect of the present disclosure.

DETAILED DESCRIPTION

Figure 1:
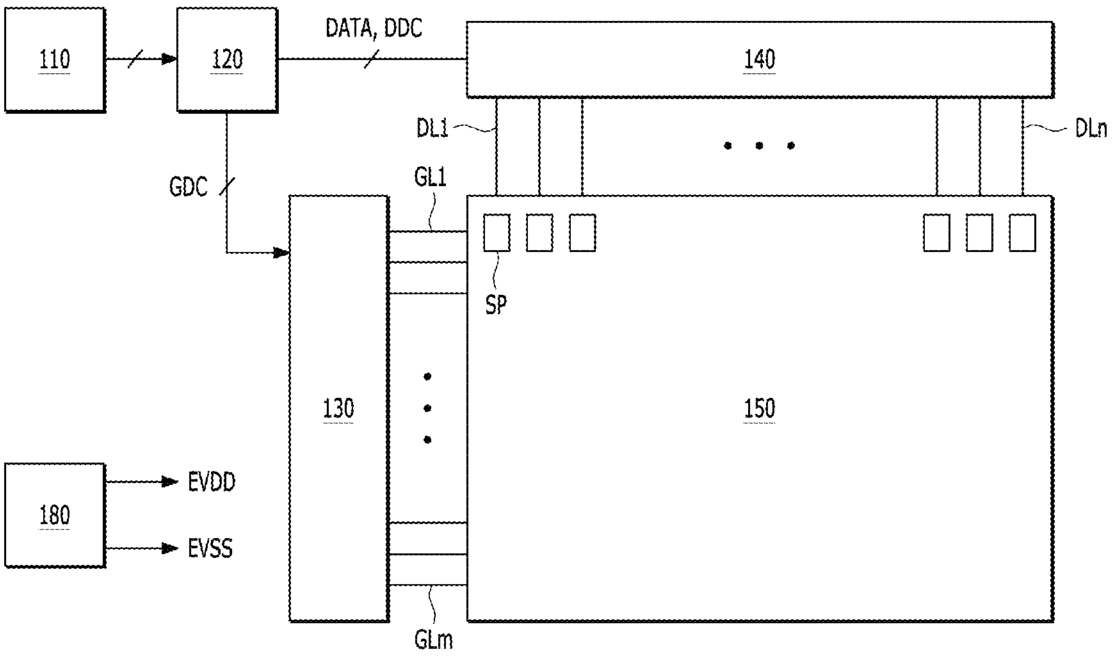
FIG. 1 is a block diagram schematically showing a configuration of a display device.

The advantages and features of the present disclosure and the way of attaining the same will become apparent with reference to aspects described below in detail in conjunction with the accompanying drawings. The present disclosure, however, is not limited to the aspects disclosed hereinafter and may be embodied in many different forms. Rather, these exemplary aspects are provided so that this disclosure will be through and complete and will fully convey the scope to those skilled in the art.

The shapes, sizes, ratios, angles, numbers, and the like, which are illustrated in the drawings to describe various aspects of the present disclosure, are merely given by way of example, and therefore, the present disclosure is not limited to the illustrations in the drawings. In the present disclosure, when the terms “comprise”, “include”, and the like are used, other elements may be added unless the term “only” is used. The singular forms are intended to include the plural forms as well, unless the context clearly indicates otherwise.

In interpretation of a component, the component is interpreted as including an error range unless otherwise explicitly described.

When describing positional relationships, for example, when the positional relationship between two parts is described using “on”, “above”, “below”, “beside”, or the like, one or more other parts may be located between the two parts unless the term “directly” or “closely” is used.

In the description of the various aspects of the present disclosure, although terms such as, for example, “first” and “second” may be used to describe various elements, these terms are merely used to distinguish the same or similar elements from each other. Therefore, in the present disclosure, an element modified by “first” may be the same as an element modified by “second” within the technical scope of the present disclosure unless otherwise mentioned.

In addition, a pixel circuit of a display device which will be described below may include a plurality of transistors. Transistors may be implemented as oxide thin film transistor (TFTs) containing an oxide semiconductor, low temperature polysilicon (LTPS) TFTs containing LTPS, and the like. Each transistor may be implemented as a p-channel TFT or an n-channel TFT.

A transistor is a three-electrode device including a gate, a source, and a drain. The source is an electrode that supplies carriers to the transistor. Within the transistor, carriers flow from the source. The drain is the electrode through which carriers exit the transistor. In a transistor, carriers flow from the source to the drain. In the case of an n-channel transistor, carriers are electrons, and thus the source voltage is lower than the drain voltage such that electrons may flow from the source to the drain. In an n-channel transistor, current flows from the drain to the source. In the case of a p-channel transistor (PMOS), carriers are holes, and thus the source voltage is higher than the drain voltage such that holes may flow from the source to the drain. In a p-channel transistor, current flows from the source to the drain because holes flow from the source to the drain. It should be noted that the source and the drain of a transistor are not fixed. For example, the source and the drain may change depending on the applied voltage. Therefore, the present disclosure is not limited by the source and the drain of a transistor. In the following description, the source and the drain of a transistor will be referred to as first and second electrodes.

A gate signal swings between a gate-on voltage and a gate-off voltage. The gate-on voltage is set to a voltage higher than a threshold voltage of the transistor, and the gate-off voltage is set to a voltage lower than the threshold voltage of the transistor. A transistor is turned on in response to the gate-on voltage and turned off in response to the gate-off voltage. For an n-channel transistor, the gate-on voltage may be a gate high voltage VGH, and the gate-off voltage may be a gate low voltage VGL. For a p-channel transistor, the gate-on voltage may be the gate low voltage VGL, and the gate-off voltage may be the gate high voltage VGH.

Like reference numerals refer to substantially like elements throughout the specification. The area and thickness of each component shown in the drawings are shown for convenience of description, and the present disclosure is not necessarily limited to the areas and thicknesses of the components shown.

The features of various aspects of the present disclosure may be combined with each other partially or entirely, various technological interconnections and operations are possible, and aspects may be implemented independently of each other or implemented together in a related relationship.

Hereinafter, aspects of the present disclosure will be described in detail with reference to the attached drawings. In the following description, when it is determined that detailed description of a known function or configuration related to the present disclosure may unnecessarily obscure the subject matter of the present disclosure, the detailed description will be omitted.

Figure 2:
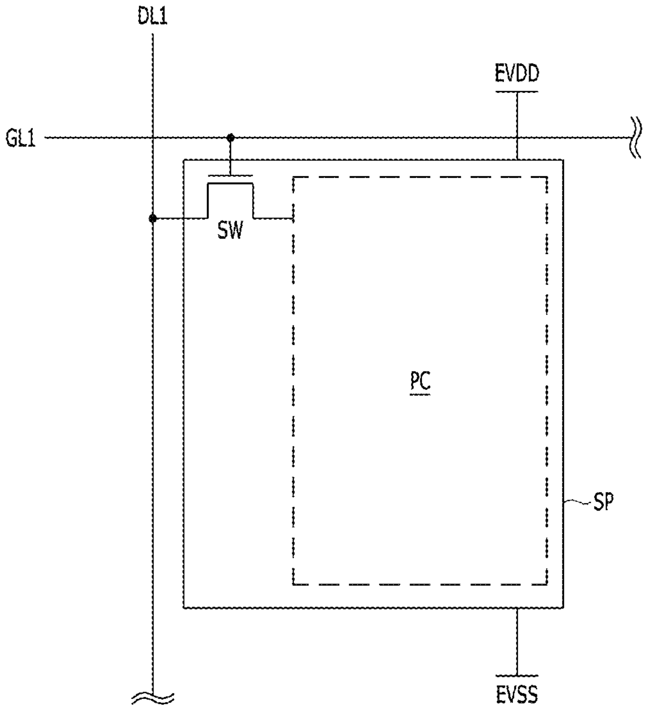
FIG. 2 is a diagram briefly showing a subpixel of FIG. 1.
Figure 3:
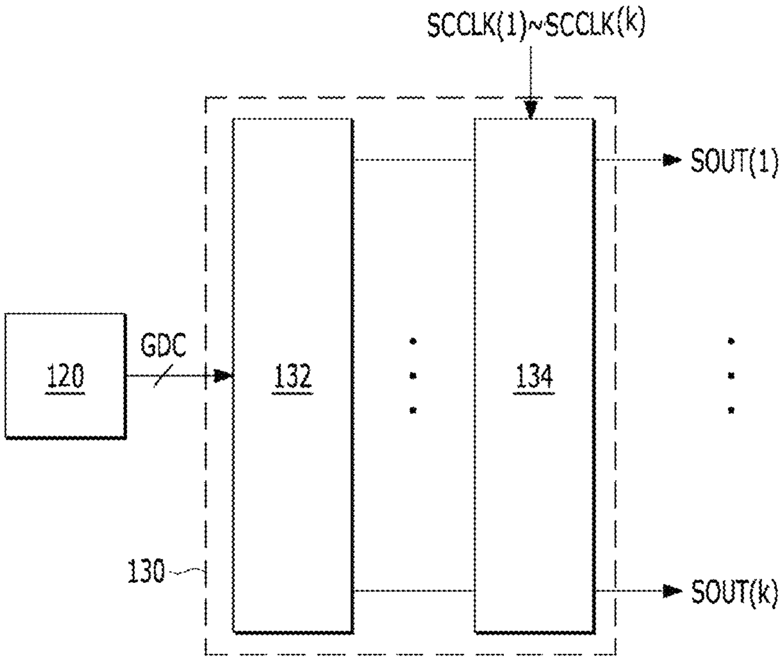
FIG. 3 is a block diagram schematically showing a configuration of a gate driving circuit according to a comparative example.

FIG. 1 is a block diagram schematically showing a configuration of a display device, FIG. 2 is a diagram briefly showing a subpixel of FIG. 1, and FIG. 3 is a block diagram schematically showing a configuration of a gate driving circuit shown in FIG. 1.

As shown in FIGS. 1 to 3, the display device includes an image provider 110, a timing controller 120, a gate driving circuit 130, a data driver 140, a display panel 150, and a power supply 180.

The image provider 110 may output various driving signals in addition to image data signals supplied from the outside or image data signals stored in an internal memory. The image provider 110 may supply data signals and various driving signals to the timing controller 120.

The timing controller 120 may output a gate timing control signal GDC for controlling an operation timing of the gate driving circuit 130, a data timing control signal DDC for controlling an operation timing of the data driver 140, and various synchronization signals (a vertical synchronization signal Vsync and a horizontal synchronization signal Hsync). The timing controller 120 may supply a data signal DATA supplied from the image provider 110 along with the data timing control signal DDC to the data driver 140. The timing controller 120 may be formed in the form of an integrated circuit (IC) and mounted on a printed circuit board, but is not limited thereto.

The power supply 180 may convert power supplied from the outside into first power at a high voltage and second power at a low voltage under the control of the timing controller 120 and output the first power and the second power through a first power line EVDD and a second power line EVSS. The power supply 180 may generate and output not only the first power and the second power but also gate voltages including a gate high voltage and a gate low voltage necessary to drive the gate driving circuit 130 or a voltage necessary to drive the data driver 140.

The data driver 140 may sample and latch a data signal DATA in response to the data timing control signal DDC supplied from the timing controller 120, convert the digital data signal into an analog data voltage on the basis of a gamma reference voltage, and output the analog data voltage. The data driver 140 may supply the data voltage to subpixels included in the display panel 150 through data lines DL1 to DLn. The data driver 140 may be formed in the form of an IC and mounted on the display panel 150 or on a printed circuit board, but is not limited thereto.

The display panel 150 may include gate lines GL and data lines DL arranged in a matrix form and a plurality of subpixels SP arranged at the intersections of the gate lines GL and the data lines DL.

As shown in FIG. 2, one subpixel SP may be connected to a first data line DL1, a first gate line GL1, a first power line EVDD, and a second power line EVSS. The first data line DL1 is a line through which a data voltage is transmitted, the first gate line GL1 is a line through which a gate signal is transmitted, the first power line EVDD is a line through which first power is transmitted, and the second power line EVSS is a line through which second power is transmitted. One subpixel SP may include a switching transistor SW that transmits a data voltage input through a data line DL in response to a gate signal input through a gate line GL and a pixel circuit PC that emits light in response to the data voltage. The pixel circuit PC may include a driving transistor that generates a driving current and an organic light emitting diode OLED that emits light in response to the driving current. An array of subpixels SP disposed on the same gate line GL is called one horizontal line HL. The subpixels SP of the same horizontal line HL are turned on by the same gate signal to receive a data voltage input through the data line DL connected to each subpixel SP.

The gate driving circuit 130 may supply at least one gate signal to subpixels included in the display panel 150 through the gate lines GL1 to GLm. The gate driving circuit 130 may be formed in the form of an IC or directly formed on the display panel 150 in a gate-in-panel (GIP) structure. The gate driving circuit 130 formed in a GIP structure may be disposed at one edge of the display panel 150 or may be divided and disposed at both edges of the display panel 150.

FIG. 3 shows a configuration of a gate driving circuit according to a comparative example.

Referring to FIG. 3, the gate driving circuit 130 may output gate signals SOUT(1) to SOUT(k) by which thin film transistors formed in the display panel 150 can be turned on or turned off in response to the gate timing control signal GDC supplied from the timing controller 120.

The gate driving circuit 130 may include a gate signal generation circuit 132 and an output control circuit 134.

The gate signal generation circuit 132 is composed of a plurality of switches and a capacitor and may generate gate signals SOUT(1) to SOUT(k) on the basis of the gate timing control signal GDC output from the timing controller 120. The gate signal generation circuit 132 may generate the gate signals SOUT(1) to SOUT(k) to be supplied to the gate lines GL1 to GLm by shifting a scan pulse according to clock timing using a shift register, and the like.

The output control circuit 134 may output the gate signals generated by the gate signal generation circuit 132 according to the timing of scan clock signals SCCLK(1) to SCCLK(k). The output control circuit 134 may output gate signals SOUT(1) to SOUT(k) according to the timing of the scan clock signals SCCLK(1) to SCCLK(k). Accordingly, when k gate signals SOUT(1) to SOUT(k) are output, k scan clock signals SCCLK(1) to SCCLK(k) are required.

As described above, the gate driving circuit according to the comparative example requires as many scan clock signals SCCLK as the number of gate signals. Therefore, when the number of gate lines GL1 to GLm increases to achieve a high scan rate and high resolution, the number of scan clock signals SCCLK also increases, and there is a problem that the design area of the gate driving circuit 130 increases To solve this problem, an aspect of the present disclosure proposes a method of configuring a gate driving circuit that may reduce the number of scan clock signals SCCLK.

Figure 4:
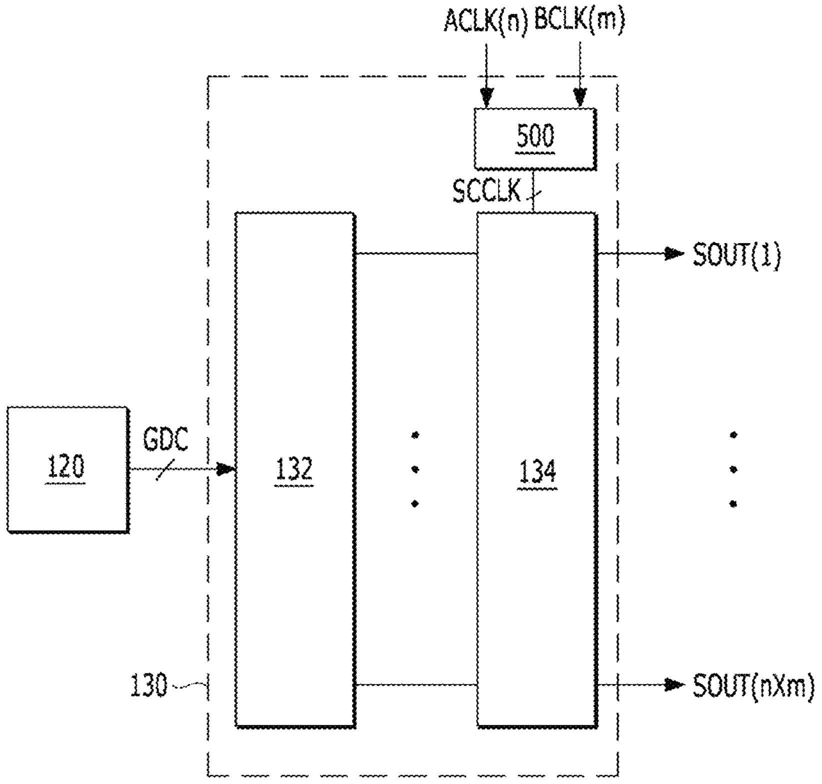
FIG. 4 is a block diagram schematically showing a configuration of a gate driving circuit according to an aspect of the present disclosure.

FIG. 4 is a block diagram schematically showing a configuration of a gate driving circuit according to an aspect of the present disclosure.

Referring to FIG. 4, the gate driving circuit according to an aspect of the present disclosure further includes a clock decoder 500 that generates scan clock signals SCCLK using a first clock signal ACLK and a second clock signal BCLK.

The gate driving circuit 130 may output gate signals SOUT(1) to SOUT(N) by which thin film transistors formed in the display panel 150 may be turned on or turned off in response to the gate timing control signal GDC supplied from the timing controller 120.

The gate driving circuit 130 may include the gate signal generation circuit 132, the output control circuit 134, and the clock decoder 500 that generates scan clock signals SCCLK using the first clock signal ACLK and the second clock signal BCLK.

The gate signal generation circuit 132 is composed of a plurality of switches and a capacitor and may generate gate signals on the basis of the gate timing control signal GDC output from the timing controller 120.

The output control circuit 134 may output the gate signals generated by the gate signal generation circuit 132 according to the timing of scan clock signals SCCLK(1) to SCCLK(n×m). The output control circuit 134 may output gate signals SOUT(1) to SOUT(n×m) according to the timing of the scan clock signals SCCLK(1) to SCCLK(n×m).

The clock decoder 500 may generate scan clock signals SCCLK by combining the first clock signal ACLK and the second clock signal BCLK. The first clock signal ACLK and the second clock signal BCLK have set pulse widths and pulse periods, and the scan clock signals SCCLK may be generated by adjusting the phases of the two clock signals ACLK and BCLK and combining the clock signals ACLK and BCLK.

Figure 5:
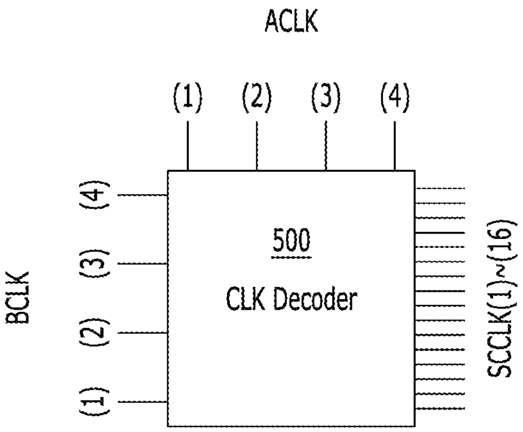
FIG. 5 is a block diagram schematically showing a configuration of a clock decoder of FIG. 4.

FIG. 5 is a block diagram schematically showing a configuration of the clock decoder 500 of FIG. 4.

Referring to FIG. 5, the clock decoder 500 may generate n×m scan clock signals SCCLK(1) to SCCLK(n×m) by combining n first clock signals ACLK(1) to ACLK(n) and m second clock signals BCLK(1) to BCLK(m), n and m being positive integers greater than 1.

The n first clock signals ACLK(1) to ACLK(n) have a preset pulse width and pulse period and may be signals that differ only in phase.

The second clock signals BCLK may be set as signals having a different pulse period from the first clock signals ACLK, and the m second clock signals BCLK(1) to BCLK (m) may be signals that differ only in phase.

Accordingly, n×m scan clock signals SCCLK(1) to SCCLK(n×m) that are sequentially output at a certain period may be generated by combining the n first clock signals ACLK(1) to ACLK(n) and the m second clock signals BCLK(1) to BCLK(m).

As described above, the gate driving circuit according to the aspect of the present disclosure may generate n×m scan clock signals SCCLK (1) to SCCLK (n×m) using only the n first clock signals ACLK(1) to ACLK(n) and the m second clock signals BCLK(1) to BCLK(m) through the clock decoder 500. Therefore, compared to the conventional gate driving circuit that requires as many scan clock lines as the number of gate signals SOUT, the aspect of the present disclosure may significantly reduce the number of scan clocks.

For example, when 16 gate signals SOUT need to be output, the gate driving circuit according to the comparative example requires lines through which 16 scan clock signals SCCLK(1) to SCCLK(16) are supplied. On the other hand, the gate driving circuit according to the aspect of the present disclosure may generate 16 (4×4) scan clock signals SCCLK (1) to SCCLK(16) by combining four first clock signals ACLK(1) to ACLK(4) and four second clock signals BCLK (1) to BCLK(4). That is, 16 scan clock signals may be generated through 8 clock lines ACLK(1) to ACLK(4) and BCLK(1) to BCLK(4).

Figure 6:
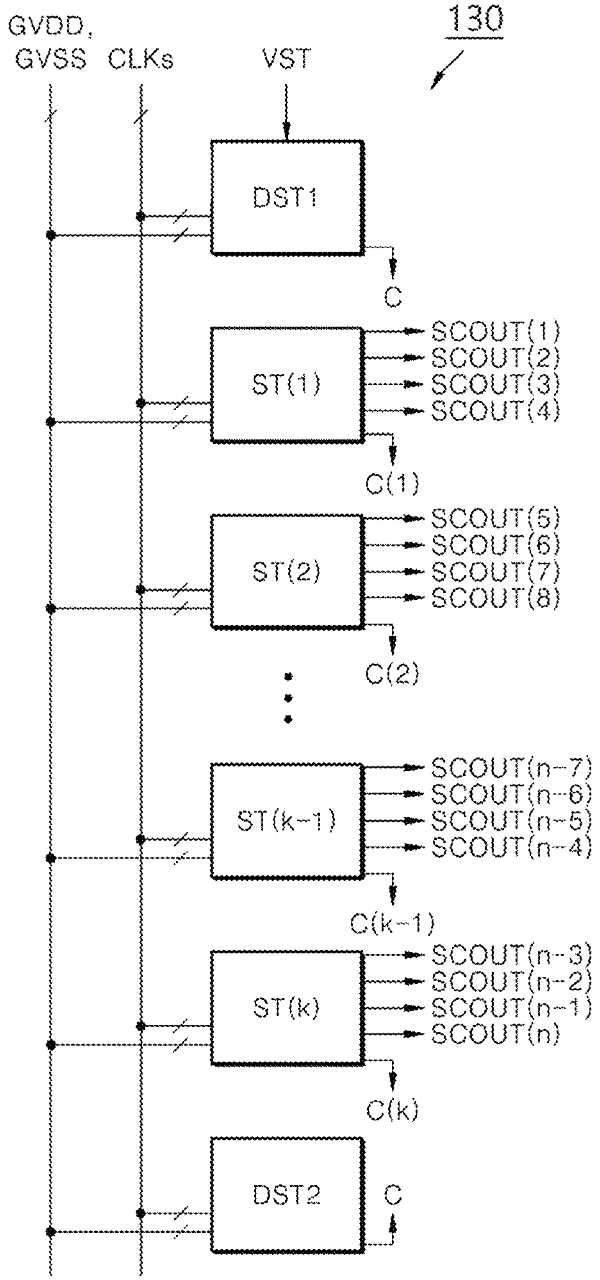
FIG. 6 is a block diagram showing a configuration of a plurality of stages included in the gate driving circuit according to an aspect of the present disclosure.

FIG. 6 is a block diagram showing a configuration of a plurality of stages included in the gate driving circuit according to an aspect of the present disclosure.

Referring to FIG. 6, the gate driving circuit 130 may include first to k-th stage circuits ST(1) to ST(k) (k being a positive integer), and gate driving voltages GVDD and GVSS and a plurality of clock signals CLKs may be input to each stage.

The gate driving circuit 130 may further include a preceding dummy stage circuit DST1 disposed before the first stage circuit ST(1) and a subsequent dummy stage circuit DST2 disposed at the rear of the k-th stage circuit ST(k).

The gate driving voltages GVDD and GVSS may include a plurality of high voltages having different voltage levels and a plurality of low voltages having different voltage levels. For example, a first high voltage GVDD1, a second high voltage GVDD2, and a third high voltage GVDD3 having different high voltage levels may be input, and a first low voltage GVSS1, a second low voltage GVSS2, and a third low voltage GVSS3 having different low voltage levels may be input. However, this is merely an example, and the number of lines included in the gate driving circuit 130 may vary depending on the aspect.

The plurality of clock signals CLKs may include a plurality of clock signals CLKs supplied from the timing controller 120, for example, a carry clock signal CRCLK, and a first clock signal ACLK and a second clock signal BCLK for generating scan clock signals SCCLK. Although not shown, other signals in addition to the aforementioned signals may be additionally provided.

The preceding dummy stage circuit DST1 outputs a preceding carry signal C in response to input of a gate start signal VST supplied from the timing controller 120. The preceding carry signal C may be supplied to any one of the first to k-th stage circuits ST(1) to ST(k).

The rear-stage dummy stage circuit DST2 outputs a subsequent carry signal C. The subsequent carry signal C may be supplied to any one of the first to k-th stage circuits ST(1) to ST(k). The first to k-th stage circuits ST(1) to ST(k) may be connected in a cascade.

In one aspect of the present disclosure, each of the first to k-th stage circuits ST(1) to ST(k) may output j (j being a positive integer) gate signals SCOUT and one carry signal C. That is, any stage circuit may output first to j-th gate signals and one carry signal C. For example, in the aspect shown in FIG. 4, each stage circuit may output four gate signals SCOUT and one carry signal C.

For example, the first stage circuit ST(1) outputs a first gate signal SCOUT(1), a second gate signal SCOUT(2), a third gate signal SCOUT(3), a fourth gate signal SCOUT(4), and a first carry signal C(1), and the second stage circuit ST(2) outputs a fifth gate signal SCOUT(5), a sixth gate signal SCOUT(6), a seventh gate signal SCOUT(7), an eighth gate signal SCOUT(8), and a second carry signal C(2). Therefore, in the aspect shown in FIG. 4, j is 4. However, the number of gate signals output by each stage circuit is not limited thereto, and in other aspects, each stage circuit may output 1, 2, or 3 gate signals, or may output 5 or more gate signals.

An aspect in which each stage circuit outputs four gate signals SCOUT and one carry signal C will be described below, but the present disclosure is not limited to this aspect.

Figure 7:
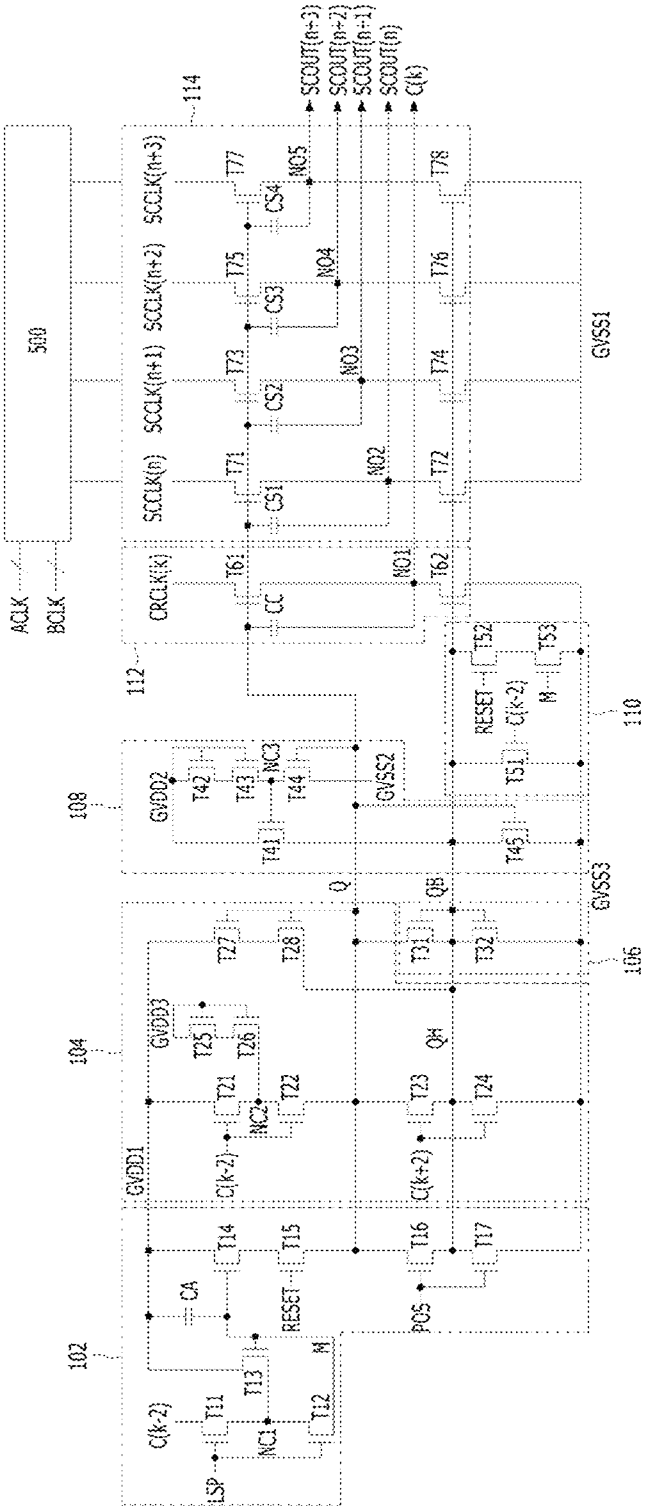
FIG. 7 is a circuit diagram of a stage circuit according to an aspect of the present disclosure.

FIG. 7 is a circuit diagram of a stage circuit, which is any one of the first to k-th stage circuits ST(1) to ST(k) shown in FIG. 6, according to an aspect of the present disclosure. Three high voltages GVDD1, GVDD2, and GVDD3 set to different levels and three low voltages GVSS1, GVSS2, and GVSS3 set to different levels may be supplied to each stage circuit.

Referring to FIG. 7, the stage circuit according to an aspect of the present disclosure includes an M node, a Q node, and a QB node. The three high voltages GVDD1, GVDD2, and GVDD3 set to different levels and the three low voltages GVSS1, GVSS2, and GVSS3 set to different levels may be supplied to each stage circuit.

The stage circuit according to an aspect of the present disclosure may include, as the gate signal generation circuit (132 in FIG. 4), a line selector 102, a Q node controller 104, a Q node and QH node stabilizer 106, an inverter 108, and a QB node stabilizer 110. The stage circuit may include a carry signal output unit 112 and a gate signal output unit 114 as the output control circuit (134 in FIG. 4). Additionally, the stage circuit may include the clock decoder 500 that supplies a scan clock signal SCCLK to the output control circuit (134 in FIG. 4).

The line selector 102 charges the M node on the basis of a preceding carry signal C(k−2) in response to input of a line sensing ready signal LSP. Additionally, the line selector 102 charges the Q node to the level of a first high voltage GVDD1 on the basis of the voltage charged at the M node in response to input of a reset signal RESET. Additionally, the line selector 102 discharges or resets the Q node to the level of the third low voltage GVSS3 in response to input of a panel on signal POS.

The line selector 102 includes first to seventh transistors T11 to T17 and a precharging capacitor CA.

The first transistor T11 and the second transistor T12 are connected between the input terminal of the preceding carry signal C(k−2) and the M node. Additionally, the first transistor T11 and the second transistor T12 are connected in series. The first transistor T11 outputs the preceding carry signal C(k−2) to a first connection node NC1 in response to input of the line sensing ready signal LSP.

The second transistor T12 electrically connects the first connection node NC1 to the M node in response to input of the line sensing ready signal LSP. For example, when the line sensing ready signal LSP at a high voltage is input to the first transistor T11 and the second transistor T12, the first transistor T11 and the second transistor T12 are simultaneously turned on and the M node is charged to the level of the first high voltage GVDD1.

The third transistor T13 is turned on when the voltage level of the M node is a high level and supplies the first high voltage GVDD1 to the first connection node NC. When the first high voltage GVDD1 is supplied to the first connection node NC1, the difference between the gate voltage of the first transistor T11 and the voltage of the first connection node NC1 increases. Therefore, when the line sensing ready signal LSP at a low level is input to the gate of the first transistor T11 and thus the first transistor T11 is turned off, the first transistor T11 may be maintained in a completely turned off state due to the difference between the gate voltage of the first transistor T11 and the voltage of the first connection node NC1). Accordingly, current leakage of the first transistor T11 and the resulting voltage drop at the M node are prevented, and thus the voltage of the M node may be maintained stably.

The precharging capacitor CA is connected between a first high voltage line through which the first high voltage GVDD1 is transmitted and the M node and stores the difference voltage between the first high voltage GVDD1 and the voltage of the M node.

The fourth transistor T14 and the fifth transistor T15 are connected between the Q node and the first high voltage line through which the first high voltage GVDD1 is transmitted. The fourth transistor T14 and the fifth transistor T15 are connected in series. The fourth transistor T14 and the fifth transistor T15 charge the Q node to the first high voltage GVDD1 in response to the voltage of the M node and the reset signal RESET. The fourth transistor T14 is turned on when the voltage of the M node is at a high level and transmits the first high voltage GVDD1 to a shared node of the fourth transistor T14 and the fifth transistor T15.

The fifth transistor T15 is turned on by the reset signal RESET at a high level and supplies the voltage of the shared node to the Q node. Accordingly, when the fourth transistor T14 and the fifth transistor T15 are simultaneously turned on, the Q node is charged to the first high voltage GVDD1.

The sixth transistor T16 and the seventh transistor T17 are connected between the Q node and a third low voltage line through which the third low voltage GVSS3 is transmitted. The sixth transistor T16 and the seventh transistor T17 are connected in series. The sixth transistor T16 and the seventh transistor T17 discharge the Q node to the third low voltage GVSS3 in response to input of the panel on signal POS. Discharging the Q node to the third low voltage GVSS3 may also be expressed as resetting the Q node.

The seventh transistor T17 is turned on by the panel on signal POS at a high level and supplies the third low voltage GVSS3 to a QH node. The sixth transistor T16 is turned on in response to input of the high-level panel on signal POS and electrically connects the Q node and the QH node. Therefore, when the sixth transistor T16 and the seventh transistor T17 are simultaneously turned on, the Q node is discharged or reset to the third low voltage GVSS3.

The Q node controller 104 charges the Q node to the level of the first high voltage GVDD1 in response to input of the preceding carry signal C(k−2) and discharges the Q node to the level of the third low voltage GVSS3 in response to input of a subsequent carry signal C(k+2). The Q node controller 104 includes first to eighth transistors T21 to T28.

The first transistor T21 and the second transistor T22 are connected between the Q node and the first high voltage line through which the first high voltage GVDD1 is transmitted. The first transistor T21 and the second transistor T22 are connected in series. The first transistor T21 and the second transistor T22 charge the Q node to the level of the first high voltage GVDD1 in response to input of the preceding carry signal C(k−2). The first transistor T21 is turned on in response to input of the preceding carry signal C(k−2) and supplies the first high voltage GVDD1 to a second connection node NC2. The second transistor T22 is turned on in response to input of the preceding carry signal C(k−2) and electrically connects the second connection node NC2 and the Q node. Therefore, when the first transistor T21 and the second transistor T22 are simultaneously turned on, the first high voltage GVDD1 is supplied to the Q node.

The fifth transistor T25 and the sixth transistor T26 are connected to the third high voltage line through which the third high voltage GVDD3 is transmitted. The fifth transistor T25 and the sixth transistor T26 supply the third high voltage GVDD3 to the second connection node NC2 in response to the third high voltage GVDD3. The fifth transistor T25 and the sixth transistor T26 are simultaneously turned on by the third high voltage GVDD3 and continuously supply the third high voltage GVDD3 to the second connection node NC2 such that the difference between the gate voltage of the first transistor T21 and the voltage of the second connection node NC2 increases. Therefore, when the low-level preceding carry signal C (k−2) is input to the gate of the first transistor T21 to turn off the first transistor T21, the first transistor T21 may be maintained in a completely turned off state due to the difference between gate voltage of the first transistor T21 and the voltage of the second connection node NC2. Accordingly, current leakage of the first transistor T21 and the resulting voltage drop at the Q node are prevented, and thus the voltage at the Q node may be maintained stably.

For example, when the threshold voltage of the first transistor T21 is negative (−), the gate-source voltage Vgs of the first transistor T21 is maintained as negative due to the third high voltage GVDD3 supplied to the drain electrode. Therefore, when the low-level preceding carry signal C(k−2) is input to the gate of the first transistor T21 to turn off the first transistor T21, the first transistor T21 is completely turned off, which prevents occurrence of leakage current. The third high voltage GVDD3 may be set to a lower voltage level than the first high voltage GVDD1.

The third transistor T23 and the fourth transistor T24 are connected between the Q node and the third low voltage line through which the third low voltage GVSS3 is transmitted. The third transistor T23 and the fourth transistor T24 are connected in series. The third transistor T23 and the fourth transistor T24 discharge the Q node and the QH node to the level of the third low voltage GVSS3 in response to input of the subsequent carry signal C(k+2). The fourth transistor T24 is turned on in response to input of the subsequent carry signal C(k+2) to discharge the QH node to the level of the third low voltage GVSS3. The third transistor T23 is turned on in response to input of the subsequent carry signal C(k+2) and electrically connects the Q node and the QH node. Accordingly, when the third transistor T23 and the fourth transistor T24 are simultaneously turned on, the Q node and the QH node may be discharged or reset to the level of the third low voltage GVSS3.

The seventh transistor T27 and the eighth transistor T28 are connected between the first high voltage line through which the first high voltage GVDD1 is transmitted and the Q node and between the first high voltage line through which the first high voltage GVDD1 is transmitted and the QH node. The seventh transistor T27 and the eighth transistor T28 are connected in series. The seventh transistor T27 and the eighth transistor T28 supply the first high voltage GVDD1 to the QH node in response to the voltage of the Q node. The seventh transistor T27 is turned on when the voltage of the Q node is at a high level and supplies the first high voltage GVDD1 to a shared node of the seventh transistor T27 and the eighth transistor T28. The eighth transistor T28 is turned on when the voltage of the Q node is at a high level and electrically connects the shared node and the QH node. Accordingly, the seventh transistor T27 and the eighth transistor T28 are simultaneously turned on when the voltage of the Q node is at a high level to supply the first high voltage GVDD1 to the QH node.

When the first high voltage GVDD1 is supplied to the QH node, the voltage difference between the gate of the third transistor T23 and the QH node increases. Therefore, when the low-level subsequent carry signal C (k+2) is input to the gate of the third transistor T23 to turn off the third transistor T23, the third transistor T23 may be maintained in a completely turned off state due to the difference between the gate voltage of the third transistor T23 and the voltage of the QH node. Accordingly, current leakage of the third transistor T23 and the resulting voltage drop at the Q node are prevented, and thus the voltage of the Q node may be maintained stably.

The Q node and QH node stabilizer 106 discharges the Q node and the QH node to the level of the third low voltage GVSS3 in response to the voltage of the QB node. The Q node and QH node stabilizer 106 includes a first transistor T31 and a second transistor T32. The first transistor T31 and the second transistor T32 are connected between the Q node and the third low voltage line through which the third low voltage GVSS3 is transmitted. The first transistor T31 and the second transistor T32 are connected in series.

The first transistor T31 and the second transistor T32 discharge the Q node and the QH node to the level of the third low voltage GVSS3 in response to the voltage of the QB node. The second transistor T32 is turned on when the voltage of the QB node is at a high level and supplies the third low voltage GVSS3 to a shared node of the first transistor T31 and the second transistor T32. The first transistor T31 is turned on when the voltage of the QB node is at a high level and electrically connects the Q node and the QH node. Accordingly, when the first transistor T31 and the second transistor T32 are simultaneously turned on in response to the voltage of the QB node, the Q node and the QH node may be discharged or reset to the level of the third low voltage GVSS3.

The inverter 108 changes the voltage level of the QB node according to the voltage level of the Q node. The inverter 108 includes first to fifth transistors T41 to T45.

The second transistor T42 and the third transistor T43 are connected between a second high voltage line through which the second high voltage GVDD2 is transmitted and a third connection node NC3. The second transistor T42 and the third transistor T43 are connected in series.

The second transistor T42 and the third transistor T43 supply the second high GVDD2 to the third connection node NC3 in response to the second high voltage GVDD2. The second transistor T42 is turned on by the second high voltage GVDD2 and supplies the second high voltage GVDD2 to a shared node of the second transistor T42 and the third transistor T43. The third transistor T43 is turned on by the second high voltage GVDD2 and electrically connects the shared node of the second transistor T42 and the third transistor T43 to the third connection node NC3. Therefore, when the second transistor T42 and the third transistor T43 are simultaneously turned on by the second high voltage GVDD2, the third connection node NC3 may be charged to the level of the second high voltage GVDD2.

The fourth transistor T44 is connected between the third connection node NC3 and a second low voltage line through which the second low voltage GVSS2 is transmitted. The fourth transistor T44 supplies the second low voltage GVSS2 to the third connection node NC3 in response to the voltage of the Q node. The fourth transistor T44 is turned on when the voltage of the Q node is at a high level to discharge or reset the third connection node NC3 to the second low voltage GVSS2.

The first transistor T41 is connected between the QB node and the second high voltage line through which the second high voltage GVDD2 is transmitted. The first transistor T41 supplies the second high voltage GVDD2 to the QB node in response to the voltage of the third connection node NC3. The first transistor T41 is turned on when the voltage of the third connection node NC3 is at a high level and charges the QB node to the level of the second high voltage GVDD2.

The fifth transistor T45 is connected between the QB node and the third low voltage line through which the third low voltage GVSS3 is transmitted. The fifth transistor T45 supplies a third low voltage GVSS3 to the QB node in response to the voltage of the Q node. The fifth transistor T45 is turned on when the voltage of the Q node is at a high level and discharges or resets the QB node to the level of the third low voltage GVSS3.

The QB node stabilizer 110 discharges the QB node to the level of the third low voltage GVSS3 in response to input of the subsequent carry signal C(k−2), input of the reset signal, and the voltage charged at the M node. The QB node stabilizer 110 includes first to third transistors T51 to T53.

The first transistor T51 is connected between the QB node and the voltage line through which the third low voltage GVSS3 is transmitted. The first transistor T51 supplies the third low voltage GVSS3 to the QB node in response to input of the preceding carry signal C(k−2).

The fifth transistor T45 is turned on when the voltage of the Q node is at a high level and discharges or resets the QB node to the level of the third low voltage GVSS3.

The second transistor T52 and the third transistor T53 are connected between the QB node and the third low voltage line through which the third low voltage GVSS3 is transmitted. The second transistor T52 and the third transistor T53 are connected in series. The second transistor T52 and the third transistor T53 discharge the QB node to the level of the third low voltage GVSS3 in response to input of the reset signal and the voltage charged at the M node.

The third transistor T53 is turned on when the voltage of the M node is at a high level and supplies the third low voltage GVSS3 to a shared node of the second transistor T52 and the third transistor T53. The second transistor T52 is turned on by the reset signal RESET and electrically connects the shared node of the second transistor T52 and the third transistor T53 and the QB node. Therefore, when the reset signal RESET is input while the voltage of the M node is at a high level, the second transistor T52 and the third transistor T53 are simultaneously turned on to discharge or reset the QB node to the level of the third low voltage GVSS2.

The carry signal output unit 112 outputs a carry signal C(k) on the basis of the voltage level of a carry clock signal CRCLK(k) or the level of the third low voltage GVSS3 according to the voltage level of the Q node or the voltage level of the QB node. The carry signal output unit 112 includes a first transistor T61, a second transistor T62, and a boosting capacitor CC.

The first transistor T61 is connected between a clock signal line through which the carry clock signal CRCLK(k) is transmitted and a first output node NOL. The boosting capacitor CC is connected between the gate and source of the first transistor T61. The first transistor T61 outputs a high-voltage carry signal C(k) through the first output node NO1 on the basis of the carry clock signal CRCLK(k) in response to the voltage of the Q node. The first transistor T61 is turned on when the voltage of the Q node is at a high level and supplies the high-voltage carry clock signal CRCLK(k) to the first output node NO1. Accordingly, the high-voltage carry signal C(k) is output.

When the carry signal C(k) is output, the boosting capacitor CC bootstraps the voltage of the Q node to a boosting voltage level higher than the level of the first high voltage GVDD1 in synchronization with the carry clock signal CRCLK(k) at a high voltage level. When the voltage of the Q node is bootstrapped, the carry clock signal CRCLK(k) at a high voltage level may be output as the carry signal C(k) rapidly and without distortion.

The second transistor T62 is connected between the first output node NO1 and the third low voltage line through which the third low voltage GVSS3 is transmitted. The second transistor T62 outputs a low-voltage carry signal C(k) through the first output node NO1 on the basis of the third low voltage GVSS3 in response to the voltage of the QB node. The second transistor T62 is turned on when the voltage of the QB node is at a high level and supplies the third low voltage GVSS3 to the first output node NO1. Accordingly, the low-voltage carry signal C(k) is output.

The gate signal output unit 114 outputs a plurality of scan gate signals SCOUT(n), SCOUT(n+1), SCOUT(n+2), SCOUT(n+3) (n being a positive integer) based on the voltage levels of a plurality of scan clock signals SCCLK(n), SCCLK(n+1), SCCLK(n+2), and SCCLK(n+3) or the level of the first low voltage GVSS1 according to the voltage level of the Q node or the voltage level of the QB node.

The gate signal output unit 114 includes first to eighth transistors T71 to T78 and boosting capacitors CS1, CS2, CS3, and CS4.

The first transistor T71, the third transistor T73, the fifth transistor T75, and the seventh transistor T77 are connected between clock signal lines through which the scan clock signals SCCLK(n), SCCLK(n+1), SCCLK(n+2), and SCCLK(n+3) are transmitted and second to fifth output nodes NO2 to NO5, respectively.

The boosting capacitors CS1, CS2, CS3, and CS4 are connected between the gates and sources of the first transistor T71, the third transistor T73, the fifth transistor T75, and the seventh transistor T77, respectively.

The first transistor T71, the third transistor T73, the fifth transistor T75, and the seventh transistor T77 output high-voltage gate signals SCOUT(n), SCOUT(n+1), SCOUT(n+2), and SCOUT(n+3) based on the scan clock signals SCCLK(n), SCCLK(n+1), SCCLK(n+2), and SCCLK(n+3) through the second output node NO2, the third output node NO3, the fourth output node NO4, and the fifth output node NO5 in response to the voltage of the Q node.

The first transistor T71, the third transistor T73, the fifth transistor T75, and the seventh transistor T77 are turned on when the voltage of the Q node is at a high level and supply the high-voltage scan clock signals SCCLK(n), SCCLK(n+1), SCCLK(n+2), and SCCLK(n+3) to the second output node NO2, the third output node NO3, the fourth output node NO4, and the fifth output node NO5. Accordingly, the high-voltage gate signals SCOUT(n), SCOUT(n+1), SCOUT(n+2), and SCOUT(n+3) are output.

When the gate signals SCOUT(n), SCOUT(n+1), SCOUT(n+2), and SCOUT(n+3) are output, the boosting capacitors CS1, CS2, CS3, and CS4 bootstrap or increase the voltage of the Q node to a boosting voltage level higher than the level of the first high voltage GVDD1 in synchronization with the scan clock signals SCCLK(n), SCCLK(n+1), SCCLK(n+2), and SCCLK(n+3). When the voltage of the Q node is bootstrapped, the high-voltage scan clock signals SCCLK(n), SCCLK(n+1), SCCLK(n+2), and SCCLK(n+3) may be output as the gate signals SCOUT(n), SCOUT(n+1), SCOUT(n+2), and SCOUT(n+3) rapidly and without distortion.

The second transistor T72, the fourth transistor T74, the sixth transistor T76, and the eighth transistor T78 output low-voltage gate signals SCOUT(n), SCOUT(n+1), SCOUT(n+2), and SCOUT(n+3) based on the first low voltage GVSS1 through the second output node NO2, the third output node NO3, the fourth output node NO4, and the fifth output node NO5 in response to the voltage of the QB node. The second transistor T72, the fourth transistor T74, the sixth transistor T76, and the eighth transistor T78 are turned on when the voltage of the QB node is at a high level to supply the first low voltage GVSS1 to the second output node NO2, the third output node NO3, the fourth output node NO4, and the fifth output node NO5. Accordingly, the low-voltage gate signals SCOUT(n), SCOUT(n+1), SCOUT(n+2), and SCOUT(n+3) are output.

The clock decoder 500 may generate scan clock signals SCCLK(n), SCCLK(n+1), SCCLK(n+2), and SCCLK(n+3) by combining the first clock signal ACLK and the second clock signal BCLK.

The first clock signal ACLK and the second clock signal BCLK may be set as signals having different pulse periods. n first clock signals ACLK(1) to ACLK(n) may be set by delaying the phase of the first clock signal ACLK, and m second clock signals BCLK(1) to BCLK(m) may be set by delaying the phase of the second clock signal BCLK.

The clock decoder 500 may generate n×m scan clock signals SCCLK(1) to SCCLK(n×m) by combining the n first clock signals ACLK(1) to ACLK(n) and the m second clock signals BCLK.

Various circuits that output pulse signals with a specific magnitude, such as the scan clock signals SCCLK, for example, using the first clock signal ACLK and the second clock signal BCLK may be applied as the clock decoder 500. For example, the clock decoder 500 may be composed of one or more switches that are turned on/off by the second clock signal BCLK to control output timing of the first clock signal ACLK and output the first clock signal ACLK as a scan clock signal SCLK, or may be configured using a logic circuit or the like.

Figure 8:
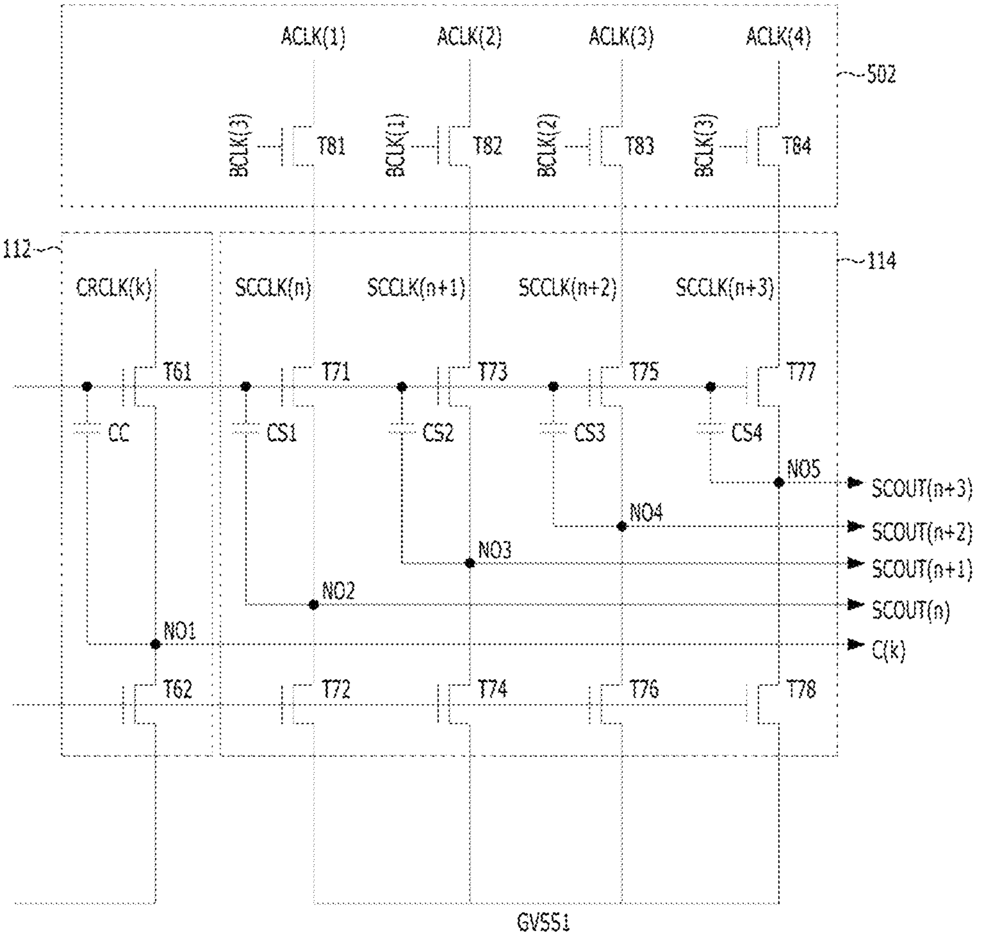
FIG. 8 is a diagram illustrating a configuration of a scan output control circuit to which a clock decoder according to a first aspect of the present disclosure is applied.

FIG. 8 is a diagram illustrating a configuration of a scan output control circuit to which a clock decoder 502 according to a first aspect of the present disclosure is applied.

Referring to FIG. 8, the clock decoder 502 may include a plurality of transistors T81, T82, T83, and T84 each having a first electrode to which a first clock signal (ACLK) supply line is connected, a gate electrode to which a second clock signal (BCLK) supply line is connected, and a second electrode to which a scan clock signal line is connected. When the transistors constituting the clock decoder 502 are N-type transistors, the first electrode to which the first clock signal ACLK is input may be a drain electrode, and the second electrode to which the scan clock signal line is connected may be a source electrode.

A first clock signal ACLK(1) may be input to the first electrode of the first transistor T81, a second clock signal BCLK(3) may be applied to the gate electrode thereof, and a first scan clock signal (SCCLK(n)) output line of the gate signal output unit 114 may be connected to the second electrode thereof.

A first clock signal ACLK(2) may be input to the first electrode of the second transistor T82, a second clock signal BCLK(1) may be applied to the gate electrode thereof, and a first scan clock signal (SCCLK(n+1)) output line may be connected to the second electrode thereof.

A first clock signal ACLK(3) may be input to the first electrode of the third transistor T83, a second clock signal BCLK(2) may be applied to the gate electrode thereof, and a first scan clock signal (SCCLK(n+2)) output line may be connected to the second electrode thereof.

A first clock signal ACLK4 may be input to the first electrode of the fourth transistor T84, a second clock signal BCLK(3) may be applied to the gate electrode thereof, and a first scan clock signal (SCCLK(n+3)) output line may be connected to the second electrode thereof.

Here, the first clock signal ACLK and the second clock signal BCLK input to the transistors T81, T82, T83, and T84 may be combined such that scan clock signals are output at preset timings according to the period and phase of the first clock signal ACLK and the period and phase of the second clock signal BCLK.

Figure 9:
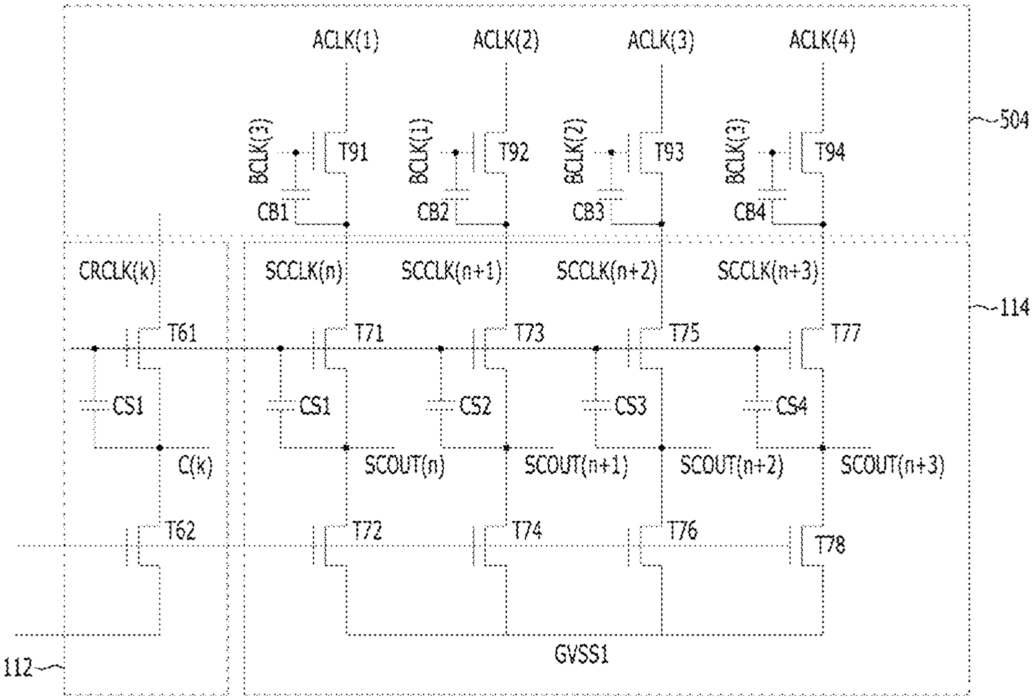
FIG. 9 is a diagram illustrating a configuration of a scan output control circuit to which a clock decoder according to a second aspect of the present disclosure is applied.

FIG. 9 is a diagram illustrating a configuration of a scan output control circuit to which a clock decoder 504 according to a second aspect of the present disclosure is applied.

Referring to FIG. 9, the clock decoder 504 according to the second aspect may include a plurality of transistors T91, T92, T93, and T94 each having a first electrode to which a first clock signal (ACLK) supply line is connected, a gate electrode to which a second clock signal (BCLK) supply line is connected, and a second electrode to which a scan clock signal line is connected, and may further include boosting capacitors CB1, CB2, CB3, and CB4.

When the transistors constituting the clock decoder 504 are N-type transistors, the first electrode to which the first clock signal ACLK is input may be a drain electrode, and the second electrode to which the scan clock signal line is connected may be a source electrode. Accordingly, the boosting capacitors CB1, CB2, CB3, and CB4 may be connected between the gates and the sources of the transistors.

A first clock signal ACLK(1) may be input to the first electrode of the first transistor T91, a second clock signal BCLK(3) may be applied to the gate electrode thereof, and a first scan clock signal (SCCLKn) output line is connected to the second electrode thereof. The boosting capacitor CB1 may be connected between the gate and the source of the first transistor T91. The first transistor T91 may output a high-voltage first clock signal SCCLK(n) based on the second clock signal BCLK(3) in response to the voltage of the first clock signal ACLK(1).

When the first scan clock signal SCCLK(n) is output, the boosting capacitor CB1 may bootstrap the voltage of the second clock signal BCLK(3) in synchronization with the first clock signal ACLK(1) at a high voltage level. When the voltage of the second clock signal BCLK(3) is bootstrapped, the first scan clock signal SCCLK(n) at a high voltage level may be output rapidly and without distortion.

The boosting capacitors CB2, CB3, and CB4 may be provided for the second transistor T92, the third transistor T93, and the fourth transistor T94, and larger current may be secured at the time of outputting the scan clock signals SCCLK(n+1), SCCLK(n+2), and SCCLK(n+3) using the boosting capacitors CB2, CB3, and CB4, thereby improving the response speed and accuracy of the scan clock signals SCCLK(n+1), SCCLK(n+2), and SCCLK(n+3).

In the clock decoders according to the first and second aspects of the present disclosure, the first clock signal ACLK and the second clock signal BCLK input to the transistors may be combined such that scan clock signals are output at preset timings according to the period and phase of the first clock signal ACLK and the period and phase of the second clock signal BCLK.

Hereinafter, a specific clock generation method will be described with reference to FIGS. 10 and 11. FIG. 10 is a clock generation table of a clock decoder according to an aspect of the present disclosure, and FIG. 11 is a timing diagram of gate signals generated according to FIG. 10.

Figure 11:
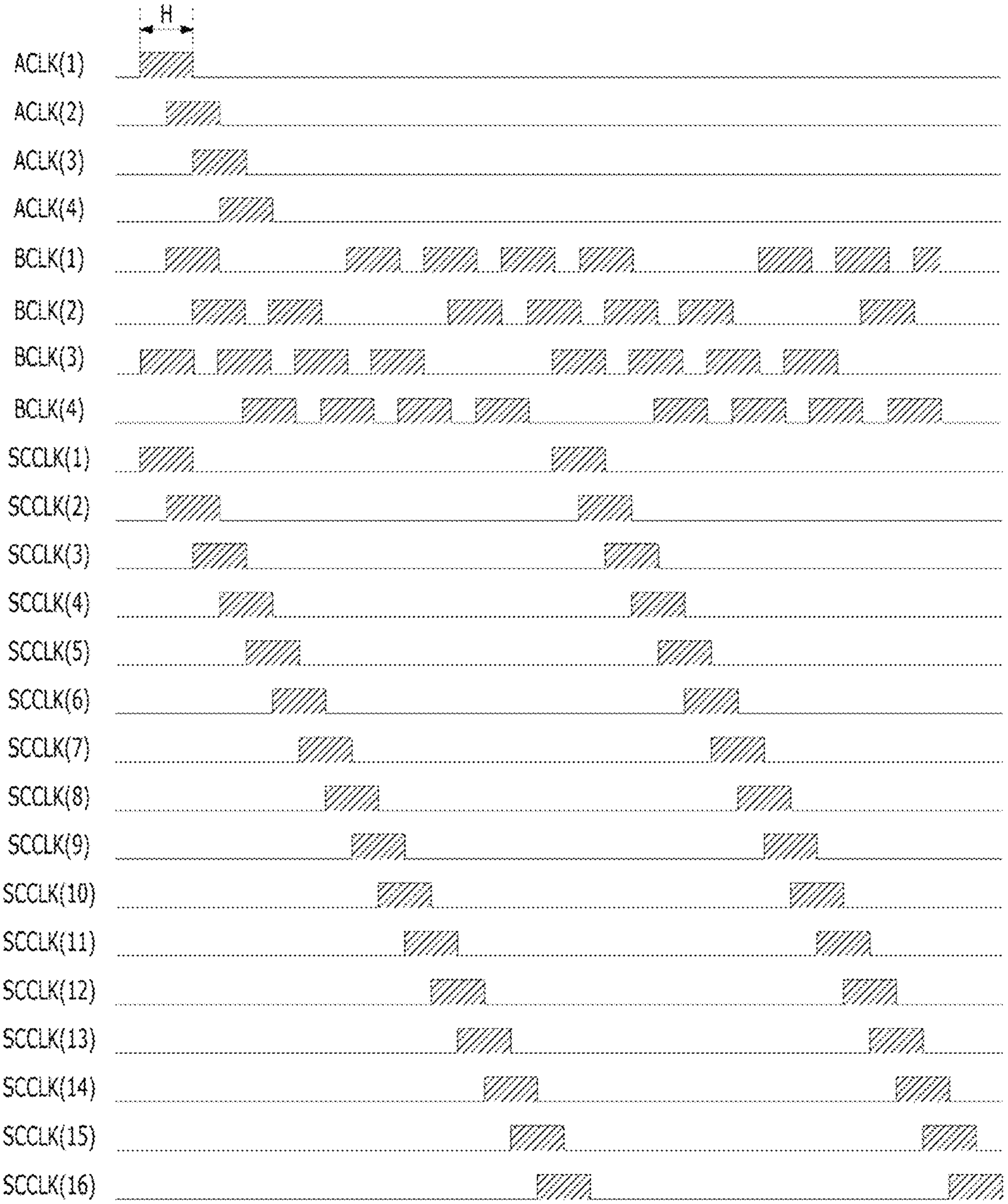
FIG. 11 is a timing diagram of gate signals generated according to FIG. 10.

In the aspect illustrated in FIGS. 10 and 11, the first clock signal ACLK may be set to a 1H pulse, and subsequent clocks may be input with a phase delay of ½H. The second clock signal BCLK input to the gate electrode may be applied such that the first clock signals ACLK are output in the form of scan clock signals SCCLK.

Referring to the clock generation table of FIG. 10, the first clock signal ACLK(1) is input to the drain electrodes of the first transistors T81 and T91, the second clock signal BCLK (3) is input to the gate electrodes, and thus the first scan clock signal SCCLK(1) may be applied. The first clock signal ACLK(2) is input to the drain electrodes of the second transistors T82 and T92 and the second clock signal BCLK (1) is input to the gate electrodes, and thus the second scan clock signal SCCLK(2) may be applied. The first clock signal ACLK(3) is input to the drain electrodes of the third transistors T83 and T93 and the second clock signal BCLK (2) is input to the gate electrodes, and thus the third scan clock signal SCCLK3 may be applied. As illustrated in the clock generation table, 16 scan clock signals SCCLK(1) to SCCLK(16) may be generated by combining four first clock signals ACLK(1) to ACLK(4) and four second clock signals BCLK(1) to BCLK(4) in such a manner that the first clock signal ACLK and the second clock signal BCLK are applied to the drain electrode and the gate electrode of each transistor included in the clock decoder.

As a result, compared to the conventional gate driving circuit in which 16 scan clock signal lines are required, scan clock signals may be generated using four first clock signals ACLK(1) to ACLK(4) and four second clock signals BCLK (1) to BCLK(4), that is, a total of 16 scan clock signal lines in the aspects of the present disclosure.

According to aspects of the present disclosure, a gate driving circuit and a display device that may maximize the efficiency of the design area may be provided by reducing the design area by simplifying the circuit while ensuring the performance of the gate driving circuit.

According to aspects of the present disclosure, a display device that may reduce manufacturing costs while maximizing design area efficiency may be provided by providing a gate driving circuit capable of bidirectional operation with a simple circuit configuration by combining clock signals CLK.

According to aspects of the present disclosure, a plurality of scan clock signals for output control of a gate driver may be generated with a small number of clock signal lines by combining clock signals with different periods and phases to generate scan clock signals.

According to aspects of the present disclosure, the design area of the gate driving circuit may be reduced by reducing the number of clock signal lines for outputting scan clock signals. As a result, a narrow bezel may be achieved by reducing the bezel area.

Aspects of the present disclosure have the following effects.

According to aspects of the present disclosure, it is possible to generate a plurality of scan clock signals for output control of a gate driver with a small number of clock signal lines by combining clock signals with different periods and phases to generate scan clock signals.

According to aspects of the present disclosure, it is possible to reduce the design area of the gate driving circuit by decreasing the number of clock signal lines for outputting scan clock signals. As a result, a narrow bezel may be implemented by reducing a bezel area.

According to aspects of the present disclosure, a plurality of scan clock signals for output control of a driver may be generated with a small number of clocks, and thus driving power may be reduced to achieve low-power driving.

The effects according to the present disclosure are not limited to the above-described effects, and various other effects are included within the present disclosure.

Although aspects of the present disclosure have been described in more detail with reference to the accompanying drawings, the present disclosure is not necessarily limited to these aspects, and various modifications may be made without departing from the technical spirit of the present disclosure. Accordingly, the aspects disclosed in the present disclosure are not intended to limit the technical idea of the present disclosure, but rather to explain the technical idea, and the scope of the technical idea of the present disclosure is not limited by these aspects. Therefore, the aspects described above should be understood in all respects as illustrative and not restrictive. The scope of the present disclosure should be interpreted in accordance with the claims, and all technical ideas within the equivalent scope should be interpreted as being within the scope of the present disclosure.

What is claimed is:

1. A display device comprising:
- a display panel in which a plurality of subpixels is disposed; and
- a gate driving circuit configured to output gate signals to the plurality of subpixels,
- wherein the gate driving circuit comprises:
- a gate signal generation circuit configured to generate the gate signals;
- a gate signal output circuit configured to output the gate signals; and
- a clock decoder configured to generate a plurality of scan clock signals for controlling output timings of the gate signals based on at least two clock signals,
- wherein the at least two clock signals comprise a first clock signal and a second clock signal that are periodic signals having different pulse periodicities, and
- wherein the clock decoder is configured to output the first clock signal as a scan clock signal, among the plurality of scan clock signals, according to an output timing that is controlled by the second clock signal.

2. The display device of claim 1, wherein the clock decoder comprises a switch interposed between a line through which the first clock signal is input and a scan clock signal line to control on/off of output of the first clock signal according to the second clock signal.

3. The display device of claim 1, wherein the clock decoder comprises:
- a transistor having a first electrode connected to the line through which the first clock signal is input;
- a gate electrode connected to a line through which the second clock signal is input; and
- a second electrode connected to a line through which the scan clock signals are applied to the gate signal output unit.

4. The display device of claim 3, further comprising a boosting capacitor connected between the gate electrode and the second electrode.

5. The display device of claim 1, wherein the clock decoder generates n×m scan clock signals on the basis of n first clock signals and m second clock signals, n and m being positive integers greater than 1.

6. The display device of claim 1, wherein the gate signal output circuit comprises:
- a pull-up transistor controlled by a voltage level of a Q node; and
- a pull-down transistor controlled by a voltage level of a QB node,
- wherein first to k-th gate signals having the voltage level of the Q node or the voltage level of the QB node are output in accordance with the scan clock signals, k being a positive integer greater than 1.

7. The display device of claim 6, wherein the gate signal output circuit sequentially outputs the first to k-th gate signals on the basis of the scan clock signals when the voltage level of the Q node is a high voltage level.

8. The display device of claim 6, wherein the scan clock signals are input to a drain electrode of the pull-up transistor.

9. The display device of claim 6, wherein the gate signal output circuit further comprises a boosting capacitor connected between a gate and a source of the pull-up transistor.

10. The display device of claim 1, wherein the first clock signal has a same pulse width as the scan clock signal generated by the clock decoder.

11. A gate driving circuit comprising:
- a pull-up transistor controlled by a voltage level of a Q node;
- a pull-down transistor controlled by a voltage level of a QB node; and
- a clock decoder configured to generate a plurality of scan clock signals for controlling output timings of gate signals based on at least two clock signals,
- wherein first to k-th gate signals having the voltage level of the Q node or the voltage level of the QB node are output in accordance with the scan clock signals, k being a positive integer greater than 1, wherein the at least two clock signals comprise a first clock signal and a second clock signal that are periodic signals having different pulse periodicities, and wherein the clock decoder is configured to output the first clock signal as a scan clock signal, among the plurality of scan clock signals, according to an output timing that is controlled by the second clock signal.

12. The gate driving circuit of claim 11, wherein the clock decoder comprises a transistor having a first electrode connected to a first clock signal input line, a gate electrode connected to a second clock signal input line, and a second electrode connected to a line through which the scan clock signals are applied to a gate signal output unit comprising the pull-up and pull-down transistors.

13. The gate driving circuit of claim 12, further comprising a boosting capacitor connected between the gate electrode and the second electrode.

14. The gate driving circuit of claim 11, wherein the clock decoder generates n×m scan clock signals on the basis of n first clock signals and m second clock signals, n and m being positive integers greater than 1.

15. The gate driving circuit of claim 11, further comprising a boosting capacitor connected between a gate and a source of the pull-up transistor.

16. The gate driving circuit of claim 11, wherein the first clock signal has a same pulse width as the scan clock signal generated by the clock decoder.

* * * * *